(12) United States Patent
Wagner et al.

(10) Patent No.: US 7,028,812 B1
(45) Date of Patent: Apr. 18, 2006

(54) BRAKE CALIPER FOR DISC BRAKE ASSEMBLY AND METHOD FOR PRODUCING SAME

(75) Inventors: Lothar Wagner, Novi, MI (US); Joe Fraser, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 197 days.

(21) Appl. No.: 10/233,061

(22) Filed: Aug. 30, 2002

(51) Int. Cl.
*F16D 55/00* (2006.01)

(52) U.S. Cl. .................. 188/71.1; 188/73.31; 188/72.4; 188/73.1

(58) Field of Classification Search .............. 188/71.1, 188/73.31, 72.4, 73.1
See application file for complete search history.

(56) References Cited

U.S. PATENT DOCUMENTS 5,957,245 A * 9/1999 Anger et al. ............... 188/71.1
6,257,378 B1 * 7/2001 Girkin et al. ............ 188/73.31
6,478,121 B1 * 11/2002 Reeves .................... 188/73.31

FOREIGN PATENT DOCUMENTS

| DE | 195 42 425 | 12/1996 |
|----|-----------|---------|
| DE | 101 06 591 | 8/2002 |
| EP | 0 774 322 | 7/1999 |
| WO | 02/064991 | 8/2002 |

* cited by examiner

*Primary Examiner*—Melanie Torres
(74) *Attorney, Agent, or Firm*—MacMillan, Sobanski & Todd, LLC

(57) ABSTRACT

This invention relates to a brake caliper adapted for use in a vehicle disc brake assembly and method for producing the same wherein the caliper has a plurality of locating surfaces provided thereon, at least one of the locating surfaces being a first locating as cast groove provided on the inboard leg portion, the groove having a first partially closed end and a second opposite opened end.

24 Claims, 11 Drawing Sheets

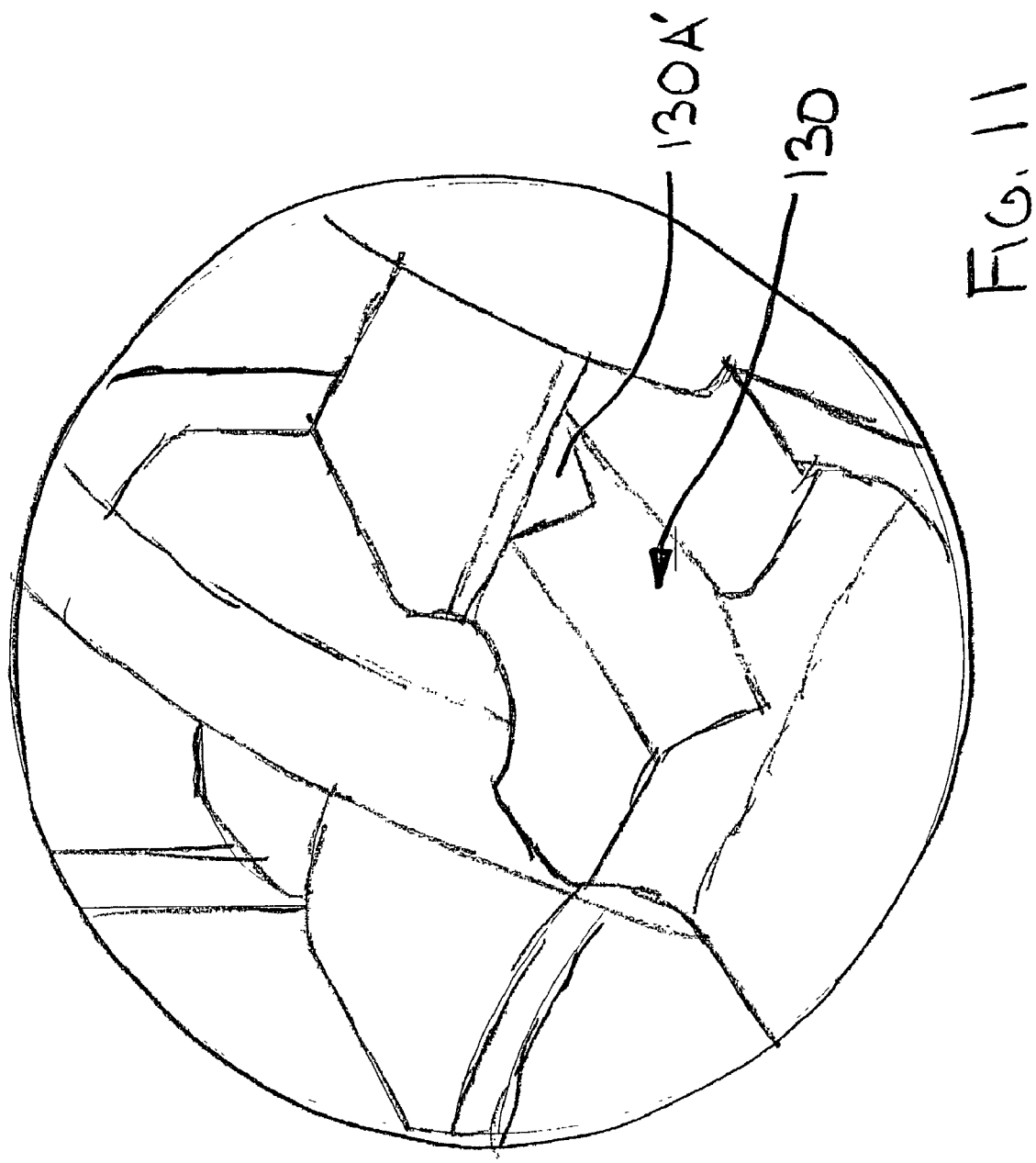

BRAKE CALIPER FOR DISC BRAKE ASSEMBLY AND METHOD FOR PRODUCING SAME

BACKGROUND OF THE INVENTION

This invention relates in general to vehicle disc brake assemblies and in particular to a brake caliper adapted for use in such a vehicle disc brake assembly and method for producing the brake caliper.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

SUMMARY OF THE INVENTION

This invention relates to a brake caliper adapted for use in a vehicle disc brake assembly and method for producing the same. The brake caliper of the present invention includes an inboard leg portion and an outboard leg portion which are interconnected by an intermediate bridge portion, the brake caliper having a first locating surface provided on the inboard leg portion, a second locating surface provided on the outboard leg portion and a third locating surface provided on the outboard leg portion, the inboard leg portion including a pair of ears and a piston bore, each ear having an opening formed therethrough, wherein the first locating surface provided on the inboard leg portion is a groove having a first partially closed end and a second opposite opened end. The method for producing the brake caliper of the present invention comprises the steps of: (a) providing an as cast brake caliper including an inboard leg portion and an outboard leg portion which are interconnected by an intermediate bridge portion, the inboard leg portion including a pair of as cast ears and a rough formed as cast piston bore, the as cast brake caliper having a plurality of locating surfaces provided thereon, at least one of the locating surfaces being a first locating as cast groove provided on the inboard leg portion, the groove having a first partially closed end and a second opposite opened end; (b) determining three planes of the as cast brake caliper by using the locating surfaces and by applying a plurality of clamping forces to selected surfaces of the as cast brake caliper, at least one of the clamping forces being applied to the outboard leg portion of the as cast brake caliper generally opposite the groove; (c) selectively machining at least an outer surface of each ear of the inboard leg portion, an opening through each of the ears, and the piston bore to predetermined tolerances with respect to one or more of the three planes determined in step (b); and (d) subsequent to step (c) and using one or more of the selected surfaces machined in step (c) as locating surfaces, selectively machining other selected surfaces of the as cast brake caliper to produce a finish machined brake caliper.

Various objects and advantages of this invention will become apparent to those skilled in the art from the following detailed description of the preferred embodiments, when read in light of the accompanying drawings.

BRIEF DESCRIPTION OF THE DRAWINGS

FIG. 11 is a view of a portion of a second embodiment of a brake caliper produced in accordance with the present invention.

DETAILED DESCRIPTION OF THE PREFERRED EMBODIMENTS

Figure 1:
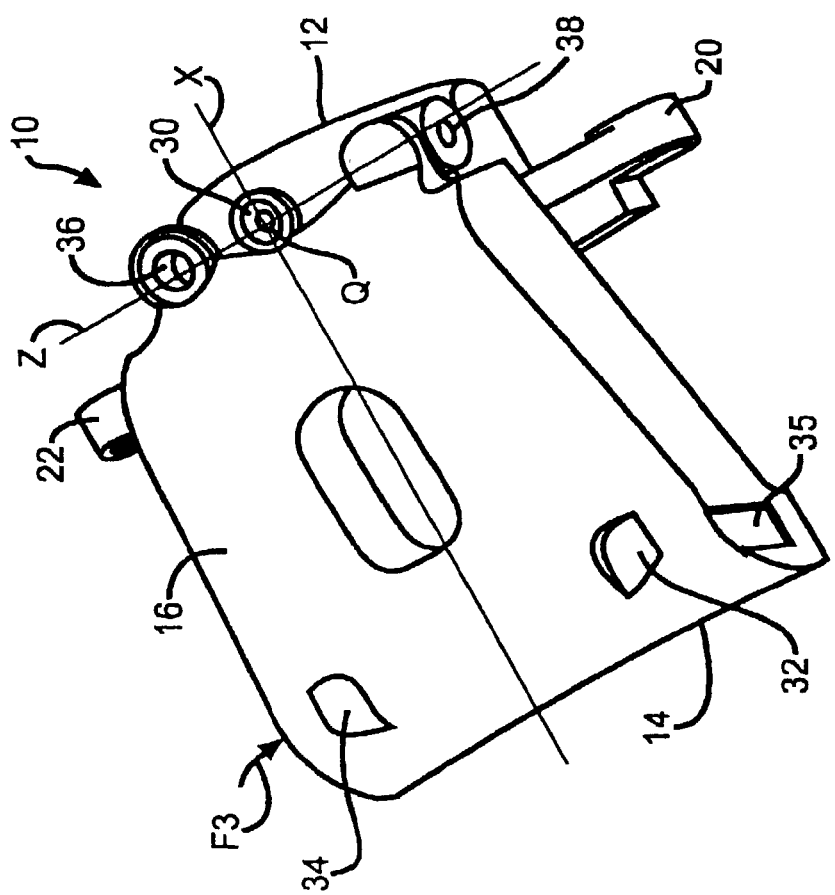
FIG. 1 is a perspective view of a prior art brake caliper.
Figure 2:
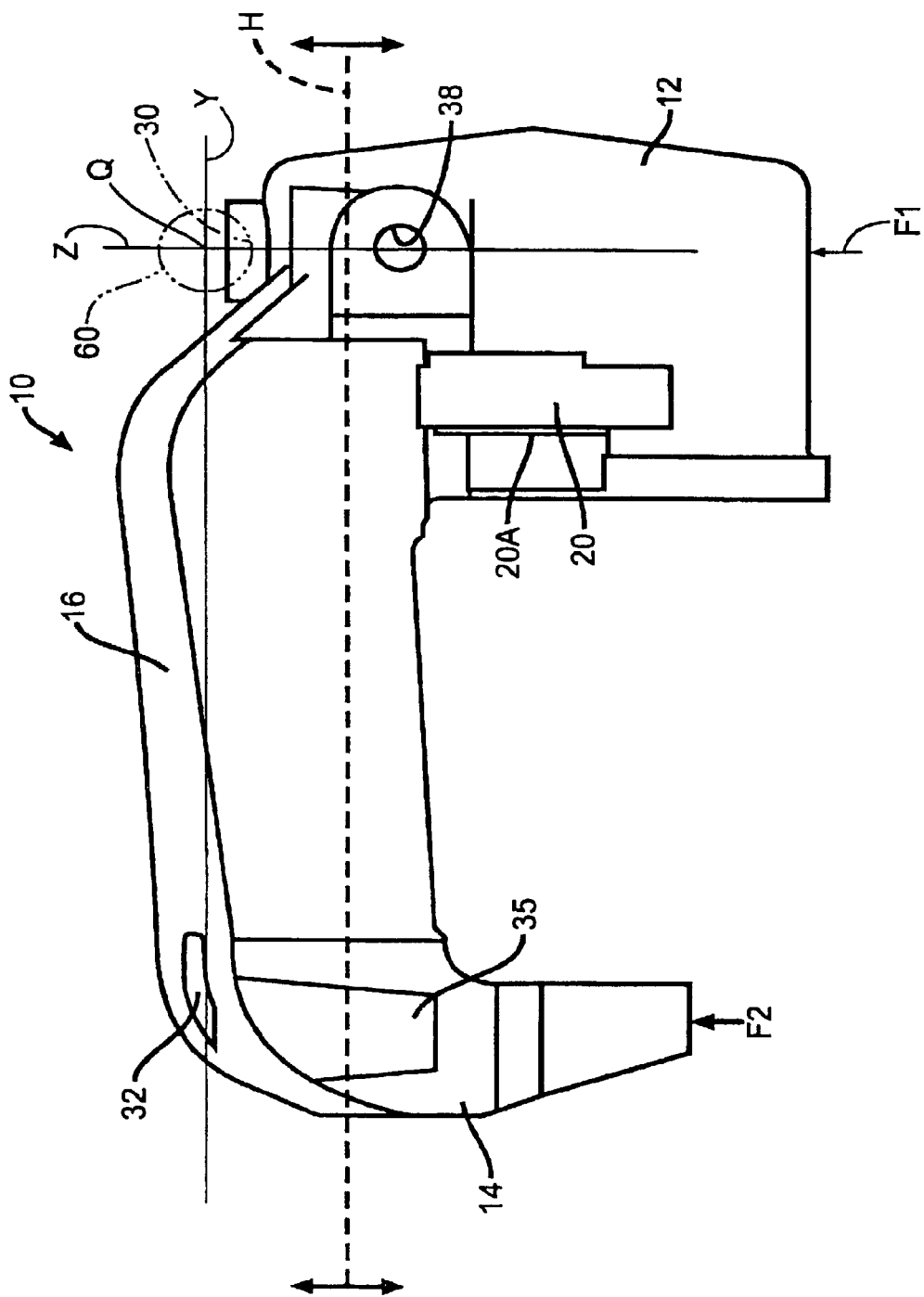
FIG. 2 is a side view of the prior art brake caliper illustrated in FIG. 1.
Figure 3:
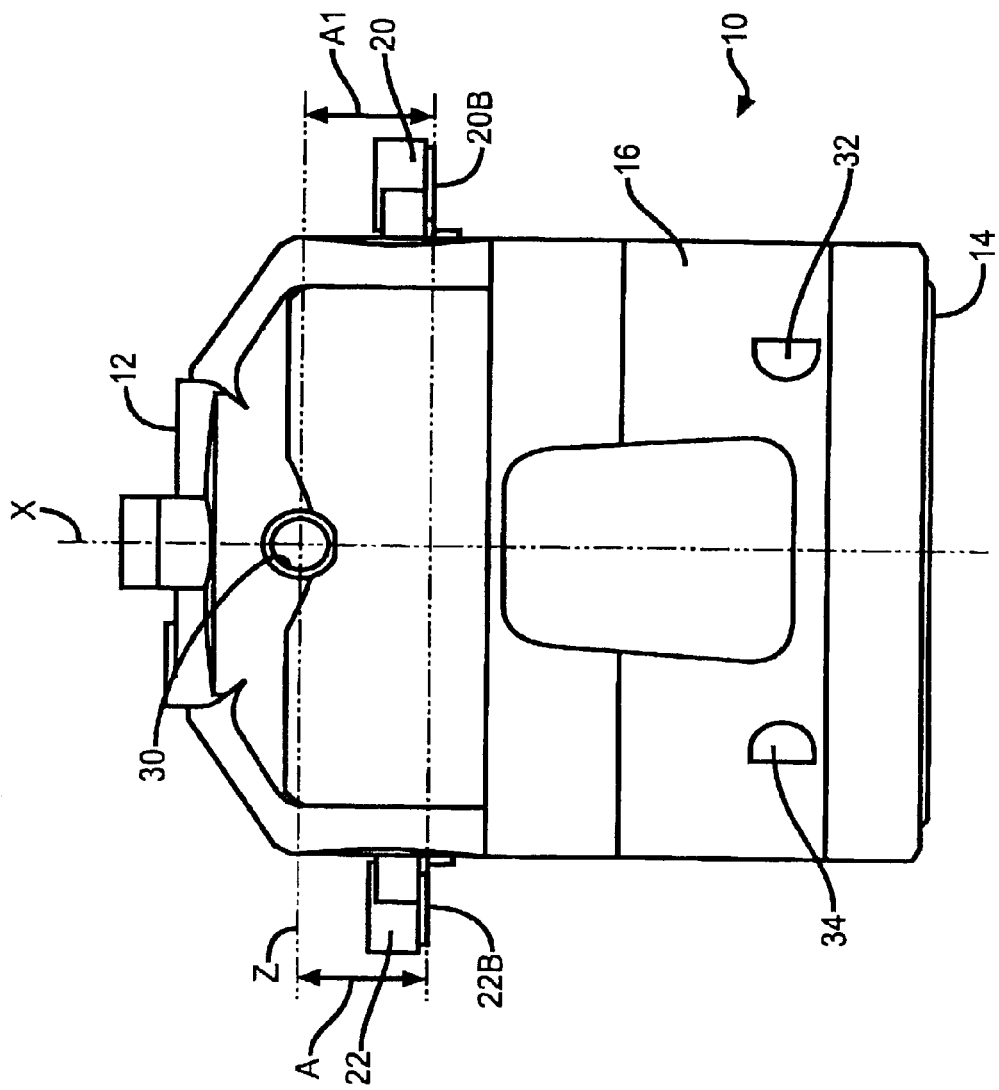
FIG. 3 is a top view of the prior art brake caliper illustrated in FIGS. 1 and 2.

Referring now to the drawings, there is illustrated in FIGS. 1–4 a prior art brake caliper, indicated generally at 10, adapted for use in a vehicle disc brake assembly. It should be noted that while this invention will be described and illustrated in conjunction with the particular prior art brake caliper structure disclosed herein, it will be appreciated that this invention may be used in conjunction with other brake caliper structures adapted for use in other kinds of vehicle disc brake assemblies.

Figure 4:
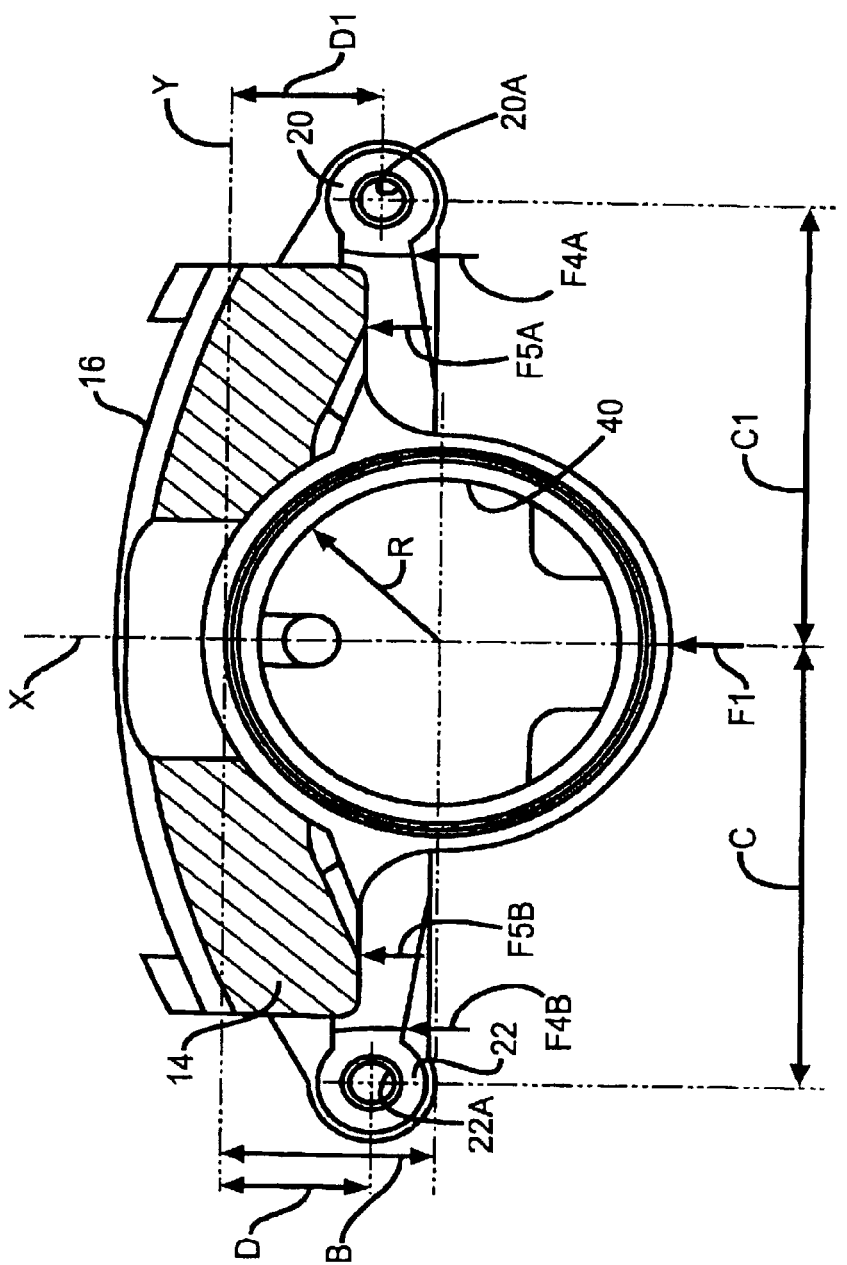
FIG. 4 is an inboard facing side view of the prior art brake caliper illustrated in FIGS. 1–3.

The illustrated brake caliper 10 is adapted for use in a "Colette" type of disc brake assembly, such as that shown in U.S. Pat. No. 5,323,882 to Waterman et al. and U.S. Pat. No. Re 30,255 to Rath et al., the disclosures of both of these patents incorporated herein by reference. The prior art brake caliper 10 is a generally C-shaped caliper and includes an inboard leg portion 12 and an outboard leg portion 14 which are interconnected by an intermediate bridge portion 16. The inboard leg 12 of the prior art brake caliper 10 includes a pair of ears 20 and 22. As best shown in FIG. 4, the ear 20 includes an opening 20A formed therethrough, and the ear 22 includes an opening 22A formed therethrough. In the illustrated embodiment, the openings 20A and 22A are non-threaded or through holes and are adapted to receive a portion of a slide pin bolt (not shown) for supporting the brake caliper 10 for sliding movement during actuation thereof in a known manner.

The prior art brake caliper 10 further includes a recess 30 and a pair of surfaces 32 and 34 for a purpose to be discussed below. Preferably, the recess 30 is a generally conical-shaped recess and the surfaces 32 and 34 are generally flat surfaces. Also, the recess 30 and the surfaces 32 and 34 are preferably as cast surfaces accurately formed during the casting process to predetermined tolerances although slight cleaning or brushing of one or more of the recess 30 and the surfaces 32 and 34 may occur subsequent to the casting process. The prior art brake caliper 10 further includes a fluid supply inlet port 36, a bleed port 38, and a piston bore 40 (partially shown in FIG. 2). Alternatively, the structure of the prior art brake caliper 10 can be other than illustrated if so desired.

Figure 5:
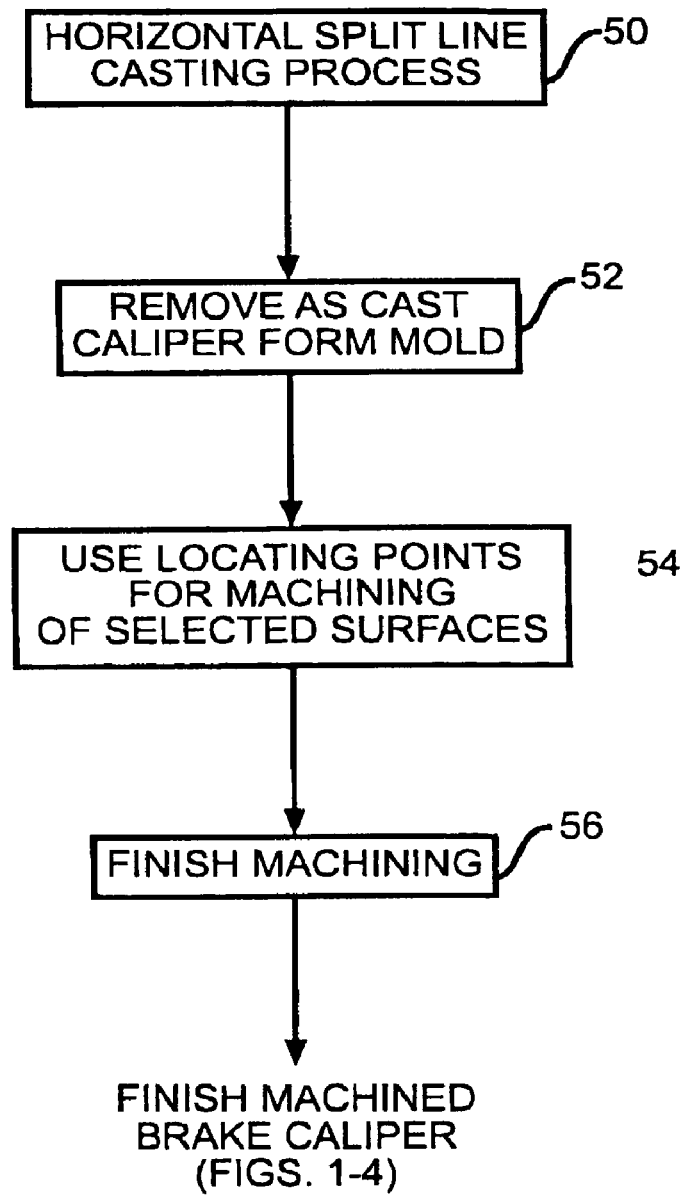
FIG. 5 is a block diagram showing a sequence of steps for producing the prior art brake caliper illustrated in FIGS. 1–4.

Referring now to prior art FIG. 5, there is illustrated a block diagram showing a sequence of steps for producing the prior art brake caliper 10. As shown therein, the prior art brake caliper 10 is produced in a casting apparatus (not shown) using a known horizontal split line casting process during step 50. As used herein, the term horizontal split line casting process means that the prior art brake caliper 10 is produced using typically two mold sections (not shown) which are disposed horizontally with respect to one another so as to produce a horizontal split line H, as shown in prior art FIG. 2. Next, the "as cast" brake caliper 10 is removed from the casting apparatus during step 52. As discussed above, the as cast brake caliper 10 includes the conical recess 30 and the flat surfaces 32 and 34.

Next, during step 54, selected surfaces of the as cast prior art brake caliper 10 are machined to predetermined tolerances using a known machining apparatus (not shown). To accomplish this, the conical recess 30 and the surfaces 32 and 34 are used as datum or locating surfaces. In particular, a suitable locating member, such as a predetermined sized ball 60 (shown in phantom in FIG. 2), is disposed in the conical recess 30 and a first clamp member (not shown), which is operative to clamp and apply a first force F1 to a surface of the inboard leg portion 12 of the caliper 10 to hold the ball 60 in the recess 30, and a second clamp member (not shown), which is operative to clamp and apply a second force F2 to a surface of the outboard leg 14 of the caliper 10, are used to define a first vertical plane Z of the as cast brake caliper 10. Then the ball 60 and the surfaces 32 and 34 are used to define a second horizontal plane Y of the as cast brake caliper 10. And then the ball 60 and a third clamp member (not shown) which is operative to clamp and apply a third force F3 on the brake caliper 10 at a generally opposite location to a clamping surface 35 provided on a side portion of the outboard leg portion 12 are used to define a third vertical plane X of the as cast brake caliper 10. Alternatively, other suitable methods can be used to hold or clamp the caliper 10 to enable the surfaces 30, 32 and 34 to be used as locating surfaces to determine the planes X, Y and Z. For example, forces other than those already described and/or in addition to can be applied to the caliper 10 at the following locations: forces F4A and F4B can be applied to the caliper ears 20 and 22, respectively, as shown in prior art FIG. 4 and/or forces F5A and F5B can be applied to the outboard leg portion 14 of the caliper 10, also shown in prior art FIG. 4.

In the illustrated embodiment, the X plane and the Z plane bisect one another in a generally perpendicular manner. And in the illustrated embodiment, the Y plane and the Z plane bisect one another in a generally perpendicular manner. Alternatively, the orientation of one or more of the three planes X, Y and Z can be other than illustrated if so desired. Also, as shown in prior art FIGS. 1 and 2, a common point Q is defined by the intersection of the three planes X, Y and Z.

Once the above described three planes X, Y and Z of the horizontal split line as cast brake caliper 10 have been established and with the forces F1, F2 and F3 applied, selected surfaces of the brake caliper 10 are machined to predetermined tolerances. In the illustrated embodiment, the selected surfaces include the machining of ears 20 and 22 and the machining of a rough cast piston bore 40. In particular, as shown in prior art FIG. 3, an outer surface 22B of the ear 22 is machined a predetermined distance A relative to the Z axis so as to define a flat outer surface which is in parallel relationship with the Z axis. Similarly, an outer surface 20B of the ear 20 is machined a predetermined distance A1 relative to the Z axis so as to define a flat outer surface which is in parallel relationship with the Z axis. In the illustrated embodiment, the distances A and A1 are the same.

Also, as shown in prior art FIG. 4, the opening 22A is machined a predetermined distance C with respect to the X axis and a predetermined distance D with respect to the Y axis. Similarly, the opening 20A is machined a predetermined distance C1 with respect to the X axis and a predetermined distance D1 with respect to the Y axis. In the illustrated embodiment, the distances C and C1 are the same and the distances D and D1 are the same. In addition, as shown in prior art FIG. 4, the piston bore 40 is machined along the X axis a predetermined distance B with respect to the Y axis so as to define a piston bore radius R. Following this, in step 56, other selected surfaces of the prior art brake caliper 10 are machined to predetermined tolerances to produce the finish machined prior art brake caliper 10. To accomplish this, one or more of the surfaces 20B and 22B, the apertures 20A and 22A, and the piston bore 40 are used as datum points to carry out the finish machining of the brake caliper 10 during step 56. The structure and method for producing the prior art brake caliper 10 thus far described and illustrated is conventional in the art.

Turning now to FIGS. 6–9, there is illustrated a first embodiment of a brake caliper, indicated generally at 100, produced in accordance with the present invention. It should be noted that while this invention will be described and illustrated in conjunction with the particular brake caliper structure disclosed herein, it will be appreciated that this invention may be used in conjunction with other brake caliper structures adapted for use in other kinds of vehicle disc brake assemblies.

Figure 6:
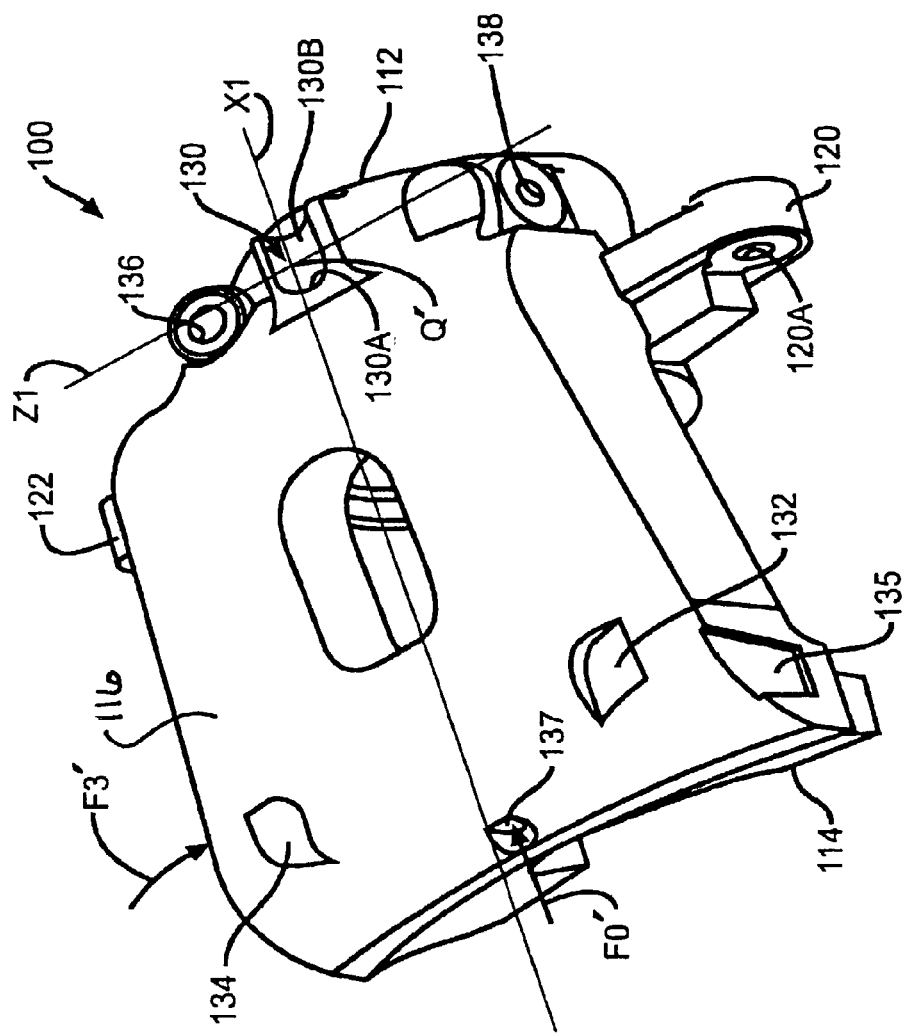
FIG. 6 is a perspective view of a first embodiment of a brake caliper produced in accordance with the present invention.

The illustrated brake caliper 100 is adapted for use in a "Colette" type of and is a generally C-shaped caliper. The brake caliper 100 includes an inboard leg portion 112 and an outboard leg portion 114 which are interconnected by an intermediate bridge portion 116. The inboard leg 112 of the brake caliper 100 includes a pair of ears 120 and 122. As shown in FIG. 6, the ear 120 includes an opening 120A formed therethrough. The ear 122 also includes an opening (not shown) formed therethrough. The openings are adapted to receive a portion of a slide pin bolt (not shown) for supporting the brake caliper 100 for sliding movement during actuation thereof in a known manner. In the illustrated embodiment, the openings are non-threaded or through holes. However, the openings can be threaded holes depending upon the particular vehicle disc brake assembly design.

The brake caliper 100 further includes a groove or slot 130 and a pair of surfaces 132 and 134 for a purpose to be discussed below. Preferably, the groove 130 is an elongated generally U-shaped or V-shaped groove having a generally forward or front closed portion 130A and a rear or back opened portion 130B. In the illustrated embodiment, the forward portion 130A of the groove 130 has a generally conical shape. Alternatively, the shape of the groove 130 can be other than illustrated if so desired. For example, as shown in FIG. 1, the groove 130 can have a generally constant shape throughout its entire length, such as V-shaped, and include a forward portion having a flat face or surface 130A'. The surfaces 132 and 134 are preferably generally flat surfaces. Also, the groove 130 and the surfaces 132 and 134 are preferably as cast surfaces accurately formed during the casting process although slight cleaning or brushing of one or more of the groove 130 and the surfaces 132 and 134 may occur subsequent to the casting process. The brake caliper 100 further includes a fluid supply inlet port 136, a bleed port 138, and a piston bore 140 (partially shown in FIG. 6). Alternatively, the structure of the brake caliper 100 can be other than illustrated if so desired. For example, the particular shape of the groove 130 of the brake caliper 100 could be any other suitable shape for a purpose to be discussed below. Also, the slot 130 is needed to produce the brake caliper 100 of the present invention because the brake caliper 100 is produced using a vertical split line V casting process. The prior art brake caliper 10 could be formed with the "closed" conical recess 30 because it is produced using a horizontal split line H casting process. Alternatively, the present invention is not limited to only a brake caliper 130 produced by a vertical split line casting process but can be practiced to provide a slot 130 in a brake caliper produced by a horizontal split line casting process.

Figure 7:
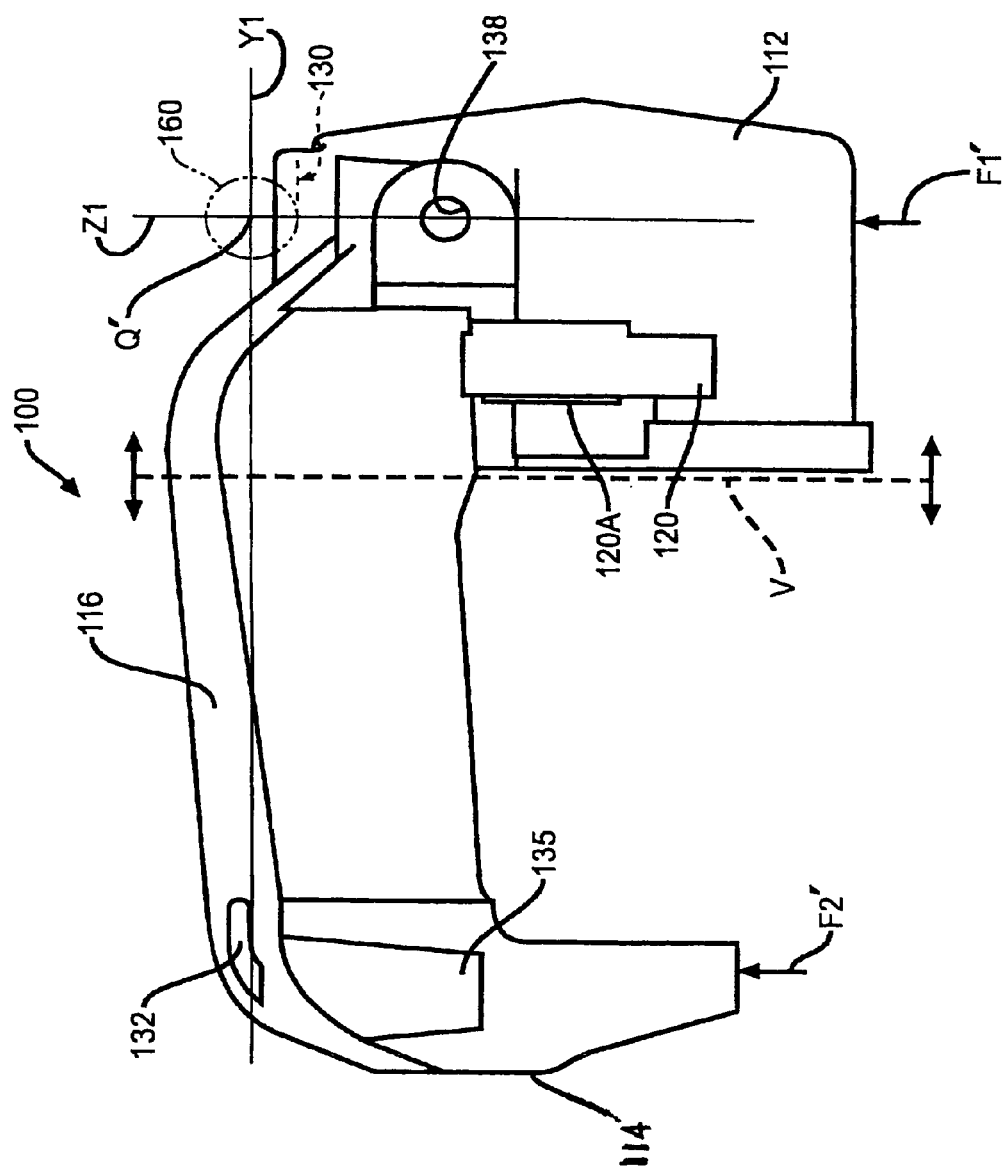
FIG. 7 is a side view of the brake caliper of the present invention illustrated in FIG. 6.
Figure 10:
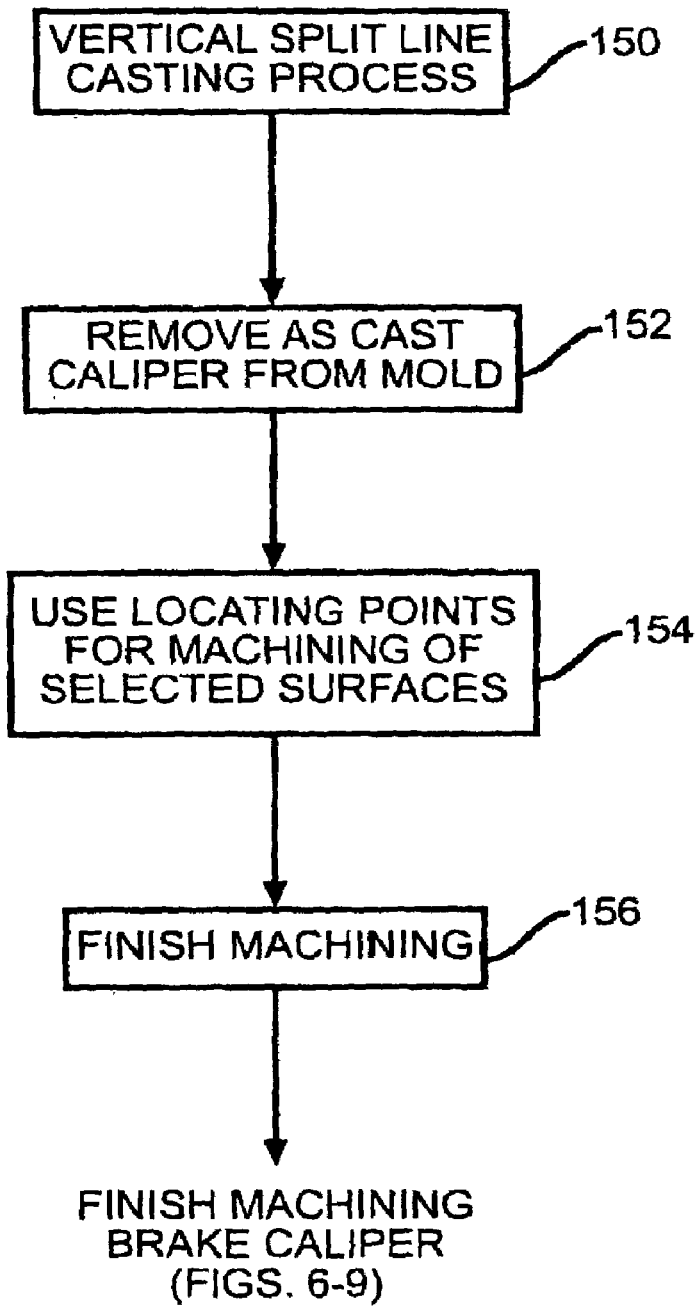
FIG. 10 is a block diagram showing a sequence of steps for producing the brake caliper of the present invention illustrated in FIGS. 6–9.

Referring now to FIG. 10, there is illustrated a block diagram showing a sequence of steps for producing the brake caliper 100 of the present invention. As shown therein, the prior art brake caliper 100 is produced in a casting apparatus (not shown) using a known vertical split line casting process during step 150. As used herein, the term vertical split line casting process means that the brake caliper 100 of the present invention is produced using typically two mold sections (not shown) which are disposed vertically with respect to one another so as to produce a vertical split line V, as shown in FIG. 7. Next, the "as cast" brake caliper 100 is removed from the casting apparatus during step 152. Thus, it can be appreciated that the slot 130 having the rear opened portion 130B is needed to enable the as cast brake caliper 100 to be removed from the mold during step 152 because the brake caliper 100 is produced using a vertical split line V casting process. The prior art brake caliper 10 could be formed with the "closed" conical recess 30 because it is produced using a horizontal split line H casting process. As discussed above, the as cast brake caliper 100 includes the groove 130 and the flat surfaces 132 and 134.

Next, during step 154, selected surfaces of the as cast brake caliper 100 are machined to predetermined tolerances using a known machining apparatus (not shown). To accomplish this, the groove 130 and the surfaces 132 and 134 are used as datum or locating surfaces. In particular, a suitable locating member, such as a predetermined sized ball 160 (shown in phantom in FIG. 7), is disposed in the partly conical shaped front portion 130A of the groove 130 and a first clamp member (not shown), which is operative to clamp and apply a first force F0' to a surface 137 of the outboard leg 114 of the brake caliper 100, and a second clamp member (not shown), which is operative to clamp and apply a second force F1' to a surface of the inboard leg portion 112 of the caliper 100 to hold the ball 160 in the groove 130, and a third clamp member (not shown), which is operative to clamp and apply a third force F2' to a surface of the outboard leg 114 of the caliper 100, are used to define a first plane Z1 of the as cast brake caliper 100. Alternatively, as discussed above, the groove 130 can have any suitable shape which allows a suitably shaped member to be disposed therein during step 154.

Then the ball 160 and the surfaces 132 and 134 are used to define a second plane Y1 of the as cast brake caliper 100. And then the ball 160 and a fourth clamp member (not shown) which is operative to clamp and apply a fourth force F3' on the brake caliper 100 at a generally opposite location to a clamping surface 135 provided on a side portion of the outboard leg portion 112 are used to define a third plane X1 of the as cast brake caliper 100. Preferably, as illustrated in the preferred embodiment, the surfaces 135 and 137 are as cast surfaces. Alternatively, other suitable methods can be used to hold or clamp the caliper 100 to enable the surfaces 130, 132 and 134 to be used as locating surfaces to determine the planes X1, Y1 and Z1. For example, forces other than those already described and/or in addition to can be applied to the caliper 100 at the following locations: forces F4A' and F4B' can be applied to the caliper ears 120 and 122, respectively, as shown in FIG. 9, and/or forces F5A' and F5B' can be applied to the outboard leg portion 114 of the caliper 100, also shown in FIG. 9.

In the illustrated embodiment of the present invention, the X1 plane is a generally vertical and the Z1 plane is a generally vertical plane and the planes X1 and Z1 bisect one another in a generally perpendicular manner. And in the illustrated embodiment, the Y1 plane is a generally horizontal plane and the Y1 and the Z1 plane bisect one another in a generally perpendicular manner. Alternatively, the orientation of one or more of the three planes X, Y and Z can be other than illustrated if so desired. Also, as shown in FIGS. 6 and 7, a common point Q is defined by the intersection of the three planes X, Y and Z. Also, in the illustrated embodiment, the first force F1' is a generally horizontal force with respect to orientation of the vertical Z1 plane so as to provide a holding or clamping force; the second force F2' is a generally vertical force with respect to the orientation of the horizontal Y1 plane so as to provide a holding or clamping force; and the third force F3' is a generally horizontal force with respect to the orientation of the vertical X1 plane so as to provide a holding or clamping force. Alternatively, depending upon the particular orientation of the brake caliper 100, the direction of the forces F1', F2' and F3' and the planes X1, Y1 and Z1 can be other than illustrated and described.

Figure 8:
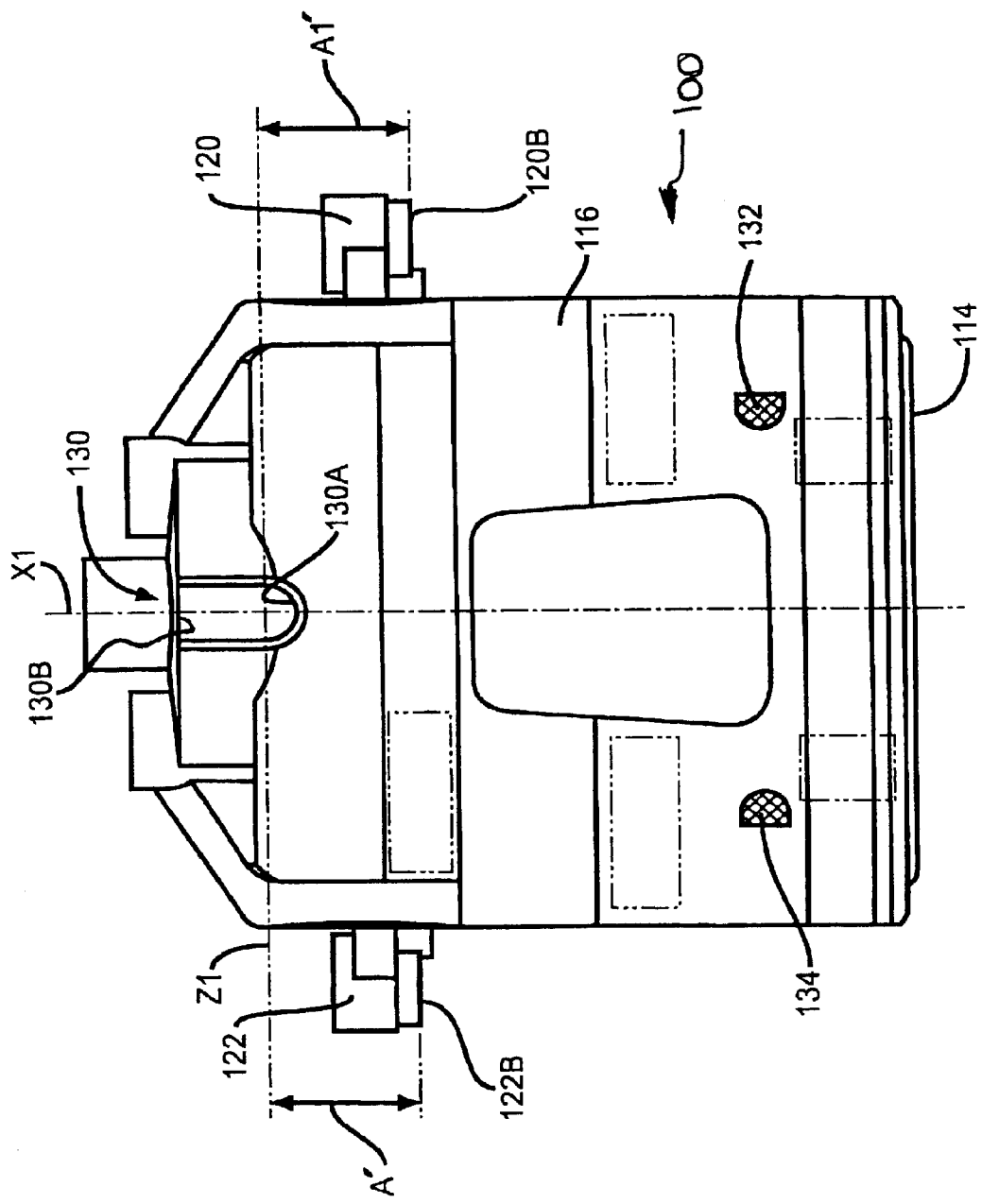
FIG. 8 is a top view of the brake caliper of the present invention illustrated in FIGS. 6 and 7.

Once the above described three planes X1, Y1 and Z1 of the vertical split line as cast brake caliper 100 of the present invention have been established and with the first, second and third forces F1, F2 and F3 applied, selected surfaces of the brake caliper 100 are machined to predetermined tolerances. In the illustrated embodiment, the selected surfaces include the machining of ears 120 and 122 and the machining of the rough cast piston bore 140. In particular, as shown in FIG. 8, an outer surface 122A of the ear 122 is machined a predetermined distance A' relative to the Z1 axis so as to define a flat outer surface which is in parallel relationship with the Z1 axis. Similarly, an outer surface 120A of the ear 120 is machined a predetermined distance A1' relative to the Z1 axis so as to define a flat outer surface which is in parallel relationship with the Z1 axis.

Figure 9:
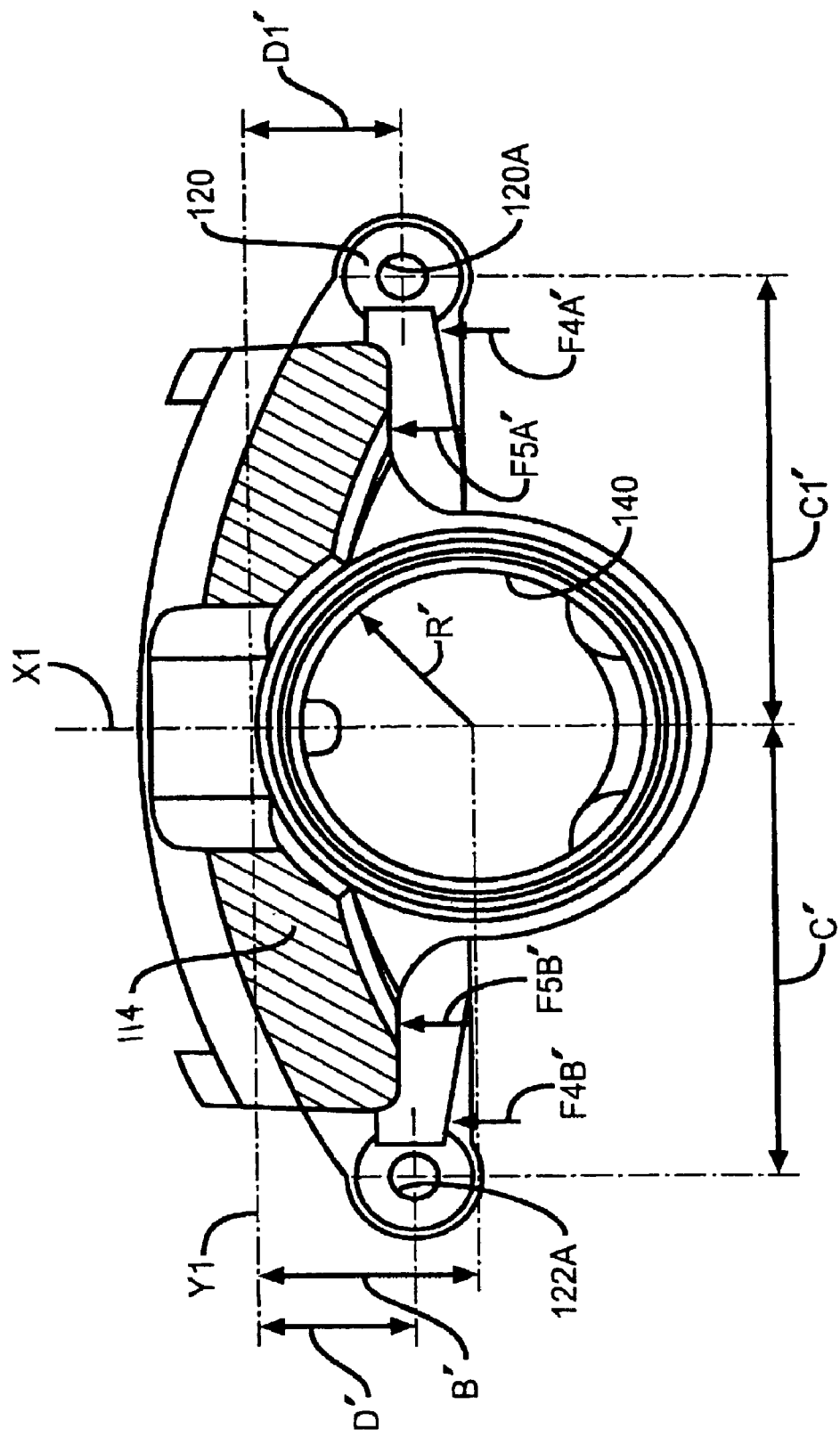
FIG. 9 is an inboard facing side view of the brake caliper of the present invention illustrated in FIGS. 6–8.

Also, as shown in FIG. 9, the opening 120A is machined a predetermined distance C' with respect to the X1 axis and a predetermined distance D' with respect to the Y1 axis. Similarly, the opening 122A of the ear 122 is machined a predetermined distance C1' with respect to the X1 axis and a predetermined distance D1' with respect to the Y axis. In the illustrated embodiment, the distances C' and C1' are the same and the distances D' and D1' are the same. Alternatively, the distances C', C1', D' and D1' can be other than illustrated if so desired. In addition, as shown in FIG. 9, the piston bore 140 is machined along the X1 axis a predetermined distance B' with respect to the Y1 axis so as to define a piston bore radius R'. Following this, in step 156, other selected surfaces of the brake caliper 100 are machined to predetermined tolerances to produce the finish machined brake caliper 100. To accomplish this, one or more of the surfaces 120B and 122B, the apertures 120A and 122A, and the piston bore 140 are used as datum points to carry out the finish machining of the brake caliper 100 during step 156.

One advantage of the present invention is that generally similar tooling can be used to initially machine the selected surfaces of the brake caliper 100 of the present invention during step 154 as that which is used to machine the prior art brake caliper 10 during step 54. This is due to the fact that the brake caliper 100 uses the locating points 130, 132 and 134 and the ball 160 during step 154 and that these locating points/ball are similar to the locating points 30, 32 and 34 and the ball 60 used to machine the prior art brake caliper 10 during step 54. The only difference is that since the ball 160 is disposed in the "opened" groove 130 of the brake caliper 100 of the present invention, instead of the ball 60 being disposed in the "closed" recess 30 of the prior art brake caliper 10, the force F1' must be applied during step 154 to hold and maintain the brake caliper 130 on the forward conical shaped portion 130A of the groove 130 during step 154. Thus, the brake caliper 100 of the present invention allows a similar machining locating scheme to be used to produce either a vertically cast brake caliper or a horizontally cast brake caliper.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A brake caliper adapted for use in a disc brake assembly including:
   a brake caliper having an inboard leg portion and an outboard leg portion which are interconnected by an intermediate bridge portion, the brake caliper having a first locating surface provided on the inboard leg portion, a second locating surface provided on the outboard leg portion and a third locating surface provided on the outboard leg portion, the inboard leg portion including a pair of ears and a piston bore having an opened outer end, each ear having an opening formed therethrough, wherein the first locating surface provided on the inboard leg portion is an elongated groove formed wholly within the inboard leg of the caliper, the groove having first opened end located adjacent an innermost end of the inboard leg and extending toward the outboard leg and terminating at a second closed end located wholly within the inboard leg and not extending past at least one of the pair of ears and the opened outer end of the piston bore so as to not extend into the intermediate bridge portion of the caliper, the groove having a generally uniform cross-section along substantially the entire length thereof.

2. The brake caliper according to claim 1 wherein the elongated groove has one of a generally V-shape and a U-shape.

3. The brake caliper according to claim 1 wherein the groove has a generally U-shape and the second closed end of the groove has a generally partly conical shape.

4. The brake caliper according to claim 1 wherein the brake caliper is one of a vertically cast brake caliper and a horizontally cast brake caliper.

5. The brake caliper according to claim 1 wherein the groove has a generally V-shape and the second closed end of the groove includes a forward portion having a flat face.

6. The brake caliper according to claim 1 wherein the second closed end is located wholly within the inboard leg and does not extend past the pair of ears so as to not extend into the intermediate bridge portion of the caliper.

7. The brake caliper according to claim 1 wherein the second closed end is located wholly within the inboard leg and does not extend past the opened outer end of the piston bore so as to not extend into the intermediate bridge portion of the caliper.

8. The brake caliper according to claim 1 wherein the second closed end is located wholly within the inboard leg and does not extend past both of the pair of ears and the opened outer end of the piston bore so as to not extend into the intermediate bridge portion of the caliper.

9. A brake caliper adapted for use in a disc brake assembly including:
   a brake caliper having an inboard leg portion and an outboard leg portion which are interconnected by an intermediate bridge portion, the brake caliper having a first locating surface provided on the inboard leg portion, a second locating surface provided on the outboard leg portion and a third locating surface provided on the outboard leg portion, the inboard leg portion including a pair of ears and a piston bore having an opened outer end, each ear having an opening formed therethrough, wherein the first locating surface provided on the inboard leg portion is an elongated groove formed wholly within the inboard leg of the caliper, the groove having first opened end located adjacent an innermost end of the inboard leg and extending toward the outboard leg and terminating at a second closed end located wholly within the inboard leg and not extending past at least one of the pair of ears and the opened outer end of the piston bore so as to not extend into the intermediate bridge portion of the caliper.

10. The brake caliper according to claim 9 wherein the groove extends a predetermined length and a predetermined uniform depth into the inboard leg of the caliper.

11. The brake caliper according to claim 9 wherein the groove has a generally uniform cross-section along substantially the entire length thereof.

12. The brake caliper according to claim 9 wherein the elongated groove has one of a generally V-shape and a U-shape.

13. The brake caliper according to claim 9 wherein the groove has a generally U-shape and the second closed end of the groove has a generally partly conical shape.

14. The brake caliper according to claim 9 wherein the groove has a generally V-shape and the second closed end of the groove includes a forward portion having a flat face.

15. The brake caliper according to claim 9 wherein the brake caliper is one of a vertically cast brake caliper and a horizontally cast brake caliper.

16. The brake caliper according to claim 9 wherein the second closed end is located wholly within the inboard leg and does not extend past the pair of ears so as to not extend into the intermediate bridge portion of the caliper.

17. The brake caliper according to claim 9 wherein the second closed end is located wholly within the inboard leg and does not extend past the opened outer end of the piston bore so as to not extend into the intermediate bridge portion of the caliper.

18. The brake caliper according to claim 9 wherein the second closed end is located wholly within the inboard leg and does not extend past both of the pair of ears and the opened outer end of the piston bore so as to not extend into the intermediate bridge portion of the caliper.

19. A brake caliper adapted for use in a disc brake assembly including:
a brake caliper selected from one of a vertically cast brake caliper and a horizontally cast brake caliper, said brake caliper having an inboard leg portion and an outboard leg portion which are interconnected by an intermediate bridge portion, the brake caliper having a first locating surface provided on the inboard leg portion, a second locating surface provided on the outboard leg portion and a third locating surface provided on the outboard leg portion, the inboard leg portion including a pair of ears and a piston bore having an opened outer end, each ear having an opening formed therethrough, wherein the first locating surface provided on the inboard leg portion is an elongated groove formed wholly within the inboard leg of the caliper, the groove having one of generally V-shape and a U-shape and extending a predetermined length and a predetermined uniform depth into the inboard leg of the caliper, the groove having first opened end located adjacent an innermost end of the inboard leg and extending toward the outboard leg and terminating at a second closed end located wholly within the inboard leg and not extending past at least one of the pair of ears and the opened outer end of the piston bore so as to not extend into the intermediate bridge portion of the caliper, the groove having a generally uniform cross-section along substantially the entire length thereof.

20. The brake caliper according to claim 19 wherein the groove has a generally U-shape and the second closed end of the groove has a generally partly conical shape.

21. The brake caliper according to claim 19 wherein the groove has a generally V-shape and the second closed end of the groove includes a forward portion having a flat face.

22. The brake caliper according to claim 19 wherein the second closed end is located wholly within the inboard leg and does not extend past the pair of ears so as to not extend into the intermediate bridge portion of the caliper.

23. The brake caliper according to claim 19 wherein the second closed end is located wholly within the inboard leg and does not extend past the opened outer end of the piston bore so as to not extend into the intermediate bridge portion of the caliper.

24. The brake caliper according to claim 19 wherein the second closed end is located wholly within the inboard leg and does not extend past both of the pair of ears and the opened outer end of the piston bore so as to not extend into the intermediate bridge portion of the caliper.

* * * * *